(12) United States Patent
Kreutz

(10) Patent No.: US 6,262,370 B1
(45) Date of Patent: Jul. 17, 2001

(54) CABLE TRANSIT

(75) Inventor: Tomas Kreutz, Lyckeby (SE)

(73) Assignee: Roxtec AB, Karlskrona (SE)

( * ) Notice: Subject to any disclaimer, the term of this patent is extended or adjusted under 35 U.S.C. 154(b) by 0 days.

(21) Appl. No.: 09/381,625

(22) PCT Filed: Mar. 27, 1998

(86) PCT No.: PCT/SE98/00566

§ 371 Date: Sep. 27, 1999

§ 102(e) Date: Sep. 27, 1999

(87) PCT Pub. No.: WO98/44515

PCT Pub. Date: Oct. 8, 1998

(30) Foreign Application Priority Data

Mar. 27, 1997 (SE) .................................................. 9701159

(51) Int. Cl.$^7$ .................................................. H02G 3/18
(52) U.S. Cl. .................................. 174/65 SS; 174/65 R; 174/151; 174/152 G
(58) Field of Search .................................. 174/51, 65 G, 174/65 R, 65 SS, 102 SP, 102 R, 107, 135, 114 R, 151, 152 G, 153 G; 248/2.1, 2.2, 16, 56

(56) References Cited

U.S. PATENT DOCUMENTS

| 3,823,334 | | 7/1974 | Philofsky et al. .................... 310/196 |
|---|---|---|---|
| 4,090,029 | * | 5/1978 | Lunderberg ........................... 174/51 |
| 4,136,259 | | 1/1979 | Djeddah ................................ 174/152 |
| 4,329,540 | * | 5/1982 | Howarth ............................ 174/65 SS |
| 4,484,962 | * | 11/1984 | Dienes et al. ........................ 174/135 |
| 4,904,826 | * | 2/1990 | Dixon ................................. 174/35 R |
| 5,294,752 | * | 3/1994 | Vallauri et al. ..................... 174/73.1 |
| 5,621,191 | * | 4/1997 | Norris et al. ..................... 174/65 SS |
| 5,920,035 | * | 7/1999 | Haney et al. ..................... 174/65 SS |

* cited by examiner

Primary Examiner—Dean A. Reichard
Assistant Examiner—Charlie Nguyen
(74) Attorney, Agent, or Firm—Jacobson Holman, PLLC

(57) ABSTRACT

A cable transit for protecting against the ingress of liquids and electromagnetic disturbances at a transit location in a wall, including a sleeve and a nut for fitting the transit tightly in the wall. The transit also includes a cable seal which comprises two semi-cylindrical bodies made of a compressible material and together fitting in the sleeve. The semi-cylindrical bodies have an adaptable center hole for accommodating a cable to be passed through the wall, and include several peelable layers. The semi-cylindrical bodies can be pressed together in tight abutment with the sleeve and with the cable, by means of the nut. The standard earthed cable sheet is earthed by means of a conductive screen. At least one peelable layer is removed along a part of the semi-cylindrical bodies, so that the semi-cylindrical bodies will present, at that part, a center hole whose diameter is greater than the diameter along the remaining part of the semi-cylindrical bodies. Each semi-cylindrical body is covered with a conductive part-screen along the remaining part.

5 Claims, 1 Drawing Sheet

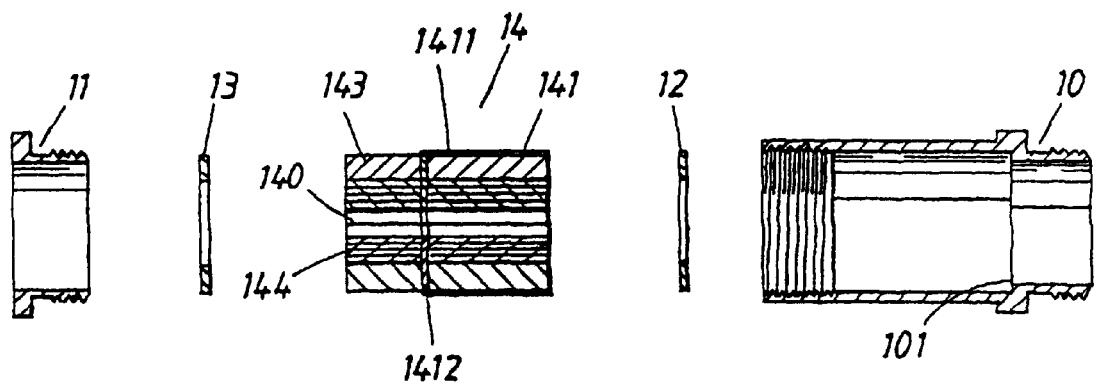
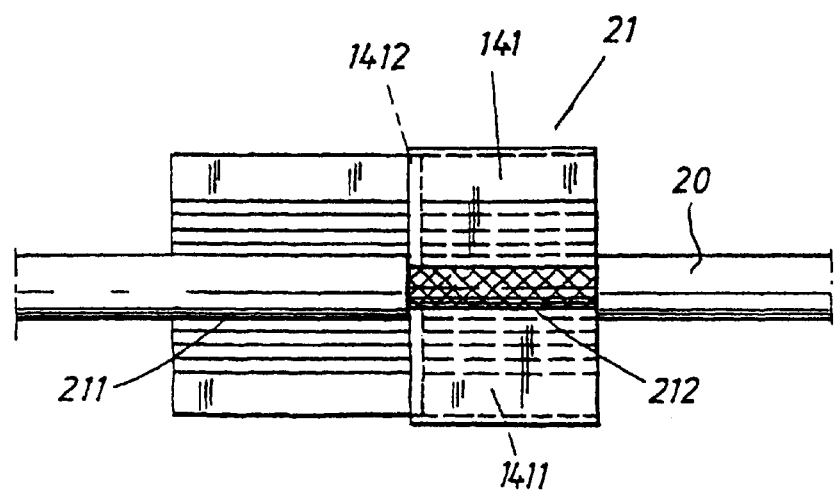

CABLE TRANSIT

FIELD OF INVENTION

The present invention relates to a cable transit, and more particularly to a transit that will provide protection against the ingress of liquids, particles and gases, and which also protects against electromagnetic disturbances or interference at a transit location in a wall. The cable transit includes a sleeve and an associated nut means, said sleeve being intended to be fitted tightly in the wall, and a cable seal which comprises two semi-cylindrical bodies made of compressible material and together fitting into the sleeve-accommodating space, wherein said cable seal includes an adaptable centre hole for accommodating the cable to be passed through said wall. The semi-cylindrical bodies are comprised of several mutually detachable or peelable layers and can be pressed into tight abutment with the outer surface against the sleeve and the inner surface against the cable, with the aid of said nut means.

BACKGROUND OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. Known screw fittings of this kind are generally difficult to work with, have only a small clamping area, and cannot readily be adapted to suit different cable sizes.

SUMMARY OF THE INVENTION

In accordance with the present invention, at least one of said peelable layers is removed along a part of the two semi-cylindrical bodies of a cable transit of the afore described kind, such that the semi-cylindrical bodies will have at this location a centre hole whose diameter is larger than the diameter of the remaining part of the semi-cylindrical bodies. The remaining part of each semi-cylindrical body is covered with a respective conductive, part-screen which form said screen when the two semi-cylindrical bodies are brought together. The aforesaid location is thus intended for a cable on which the outer insulating sheath is still intact, while the remaining part is intended for a part of the cable from which the sheath has been removed.

The aforesaid screen will conveniently comprise an inner part comprised of conductive rubber and an outer part comprised of conductive tape.

BRIEF DESCRIPTION OF THE DRAWINGS

The invention will now be described in more detail with reference to the accompanying schematic drawing, in which FIG. 1 is a sectioned view of the various components of an inventive cable transit; and FIG. 2 illustrates one-half of the transit with a cable laid therein.

DESCRIPTION OF PREFERRED EMBODIMENTS

The cable transit shown in FIG. 1 includes a sleeve 10, a sleeve-associated nut means 11, a bottom plate 12 which is intended to lie against a bottom edge 101 in the sleeve 10, cable sealing means 14 comprising two semi-cylindrical bodies 143, 144 (half of each of which is shown in the Figure) made of compressible material and together fitting into the internal cavity of the sleeve and having a centre hole 140 intended to receive a cable that is to be passed through a wall. The semi-cylindrical bodies comprise several peelable layers and can be pressed into tight abutment with both the sleeve on the outer side of the semi-cylindrical bodies and with the cable on the inner side or said bodies, by means of an outer disc-plate or washer 13 and the nut means 11.

Each semi-cylindrical body has wound therearound a part screen 141 made of conductive material, such that when the semi-cylindrical bodies are brought together said partscreens will form a full cable screen. The screen may consist of an internal, relatively short part 1412 made of conductive rubber, and an outer, relatively long part 1411 made of conductive tape.

FIG. 2 shows a semi-cylindrical body 21 where at least one of the peelable layers has been removed along a part 211 of said body, so that said semi-cylindrical body will have at this location a centre hole whose diameter is larger than the diameter along the remaining part 212 of said body. This enables a cable whose outer insulation has been removed to be laid in the semi-cylindrical body along a distance that is equal to the length of said remaining part. The conductive part-screen 141 of said semi-cylindrical body will thus come into contact with the standard earthed screen of the cable, along a considerable distance, i.e. a distance which is equally as long as the length of said remaining part 212.

When using an inventive transit, a sleeve 10 and a washer 13 are threaded onto the cable 20. The cable 20 is placed on a semi-cylindrical body 21 with that part of the cable from which the insulation has been removed positioned in that part 212 of the centre hole that has the smallest diameter. An identical semi-cylindrical body 21 is then placed in position and the combination consisting of the two semi-cylindrical bodies and the enclosed cable is inserted into the sleeve 10. The washer 1:3 and the nut 11 are then threaded onto the left end of the cable and the nut screwed into the sleeve 10 so as to press together the cable seal 21 (the semi-cylindrical bodies) and the sleeve 10.

The invention being thus described, it will be obvious that the same may be varied in many ways. Such variations are not to be regarded as a departure from the spirit and scope of the invention, and all such modifications as would be recognized by one skilled in the art are intended to be included within the scope of the following claims.

What is claimed is:

1. A cable transit for protecting against the ingress of liquids, particles and gases, and for protecting against electromagnetic disturbances or interference at a wall transit location within a wall, said transit comprising a sleeve having an internal cavity and an associated nut means, said sleeve fitting tightly in said wall, a cable sealing means which includes two semi-cylindrical bodies that are made of a compressible material and that together fit into the internal cavity of the sleeve and that have an adaptable center hole for accommodating a cable to be passed through said wall, said semi-cylindrical bodies having several layers that can be peeled one from the other, wherein said semi-cylindrical bodies can be pressed together and into tight abutment with both the sleeve on an outer side of said bodies and with the cable on an inner side of said bodies, said transit further including a conductive screen for earthing a normally earthed cable screen around a whole circumference thereof, wherein at least one of said peelable layers is removed along a part of the two semi-cylindrical bodies so that said semi-cylindrical bodies have at said part a center hole whose diameter is greater than a diameter of a remaining part of the semi-cylindrical bodies, and wherein a part-screen of conductive material is placed around said remaining part of each semi-cylindrical body, such that the two part-screens together form said conductive screen, said part where at least one peelable layer has been removed being for a portion of said cable whose outer insulating sheath is still intact and the remaining part being for a portion of said cable from which said insulating sheath has been stripped.

2. The cable transit according to claim 1, wherein each of said part-screens is comprised of an inner part which is made of conductive rubber and is intended mainly to protect against airborne disturbances, and of an outer part comprised of conductive tape and intended mainly to protect against cable-carried disturbances.

3. A cable transit for protecting a cable at a wall transit location within a wall, comprising:

- a sleeve having an inside surface defining an internal cavity, said sleeve for fitting tightly in said wall;
- two semi-cylindrical bodies made of a compressible material and together fitting into the internal cavity of the sleeve, said bodies having several peelable layers and a center hole for accommodating a cable to be passed through said wall, at least one of said peelable layers being removed along a part of the two semi-cylindrical bodies so that said semi-cylindrical bodies have at said part a center hole whose diameter is greater than a diameter of a remaining part of the semi-cylindrical bodies, said part where at least one peelable layer has been removed contacting a portion of said cable over which an outer insulating sheath is still intact and the remaining part contacting a portion of said cable from which said insulating sheath has been stripped, wherein said semi-cylindrical bodies can be pressed together and into tight abutment with both the inside surface of said sleeve and with an outer surface of said cable; and
- a screen of conductive material placed around said remaining part of each semi-cylindrical body such that the two semi-cylindrical bodies, when pressed together inside the sleeve, form a conductive screen for grounding the cable around a whole circumference thereof.

4. The cable transit according to claim 3, each screen of conductive material placed around said remaining part having an inner part made of conductive rubber, and an outer part of conductive tape.

5. The cable transit according to claim 3, further comprising a disc-plate and a nut fitted to said sleeve for pressing said semi-cylindrical bodies into tight abutment with the internal cavity of said sleeve.

* * * * *